(12) United States Patent
Wang et al.

(10) Patent No.: US 7,398,430 B2
(45) Date of Patent: *Jul. 8, 2008

(54) SYSTEM AND METHOD FOR SELF-DIAGNOSING SYSTEM CRASHES

(75) Inventors: Landy Wang, Redmond, WA (US); Matthew D. Hendel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/549,073

(22) Filed: Oct. 12, 2006

(65) Prior Publication Data

US 2007/0168739 A1 Jul. 19, 2007

Related U.S. Application Data

(63) Continuation of application No. 10/808,877, filed on Mar. 23, 2004, now Pat. No. 7,127,642, which is a continuation of application No. 09/549,940, filed on Apr. 14, 2000, now Pat. No. 6,728,907.

(51) Int. Cl.
   G06F 11/00 (2006.01)
(52) U.S. Cl. .......................... 714/45; 714/37
(58) Field of Classification Search ............ 714/37, 714/45
   See application file for complete search history.

(56) References Cited

U.S. PATENT DOCUMENTS

| | | | | |
|---|---|---|---|---|
| 4,999,838 A * | 3/1991 | Horikawa | ............ | 714/2 |
| 5,111,384 A * | 5/1992 | Aslanian et al. | ............ | 714/26 |
| 5,355,469 A * | 10/1994 | Sparks et al. | ............ | 714/38 |
| 5,390,324 A * | 2/1995 | Burckhartt et al. | ............ | 714/23 |
| 5,485,573 A * | 1/1996 | Tandon | ............ | 714/25 |
| 5,590,329 A * | 12/1996 | Goodnow et al. | ............ | 717/144 |
| 5,598,577 A * | 1/1997 | Overfield | ............ | 710/10 |
| 5,790,777 A * | 8/1998 | Izuta et al. | ............ | 714/45 |
| 5,819,024 A * | 10/1998 | Kasuga et al. | ............ | 714/26 |
| 5,948,112 A * | 9/1999 | Shimada et al. | ............ | 714/16 |
| 5,999,933 A * | 12/1999 | Mehta | ............ | 707/100 |
| 6,101,617 A * | 8/2000 | Burckhartt et al. | ............ | 714/23 |
| 6,226,761 B1 * | 5/2001 | Berstis | ............ | 714/37 |
| 6,279,120 B1 * | 8/2001 | Lautenbach-Lampe et al. | ............ | 714/15 |
| 6,311,327 B1 * | 10/2001 | O'Brien et al. | ............ | 717/114 |
| 6,430,707 B1 * | 8/2002 | Matthews et al. | ............ | 714/37 |
| 6,543,010 B1 * | 4/2003 | Gaudet et al. | ............ | 714/45 |
| 6,728,907 B1 * | 4/2004 | Wang et al. | ............ | 714/47 |
| 6,948,099 B1 * | 9/2005 | Tallam | ............ | 714/38 |
| 7,127,642 B2 * | 10/2006 | Wang et al. | ............ | 714/45 |

* cited by examiner

Primary Examiner—Joshua A Lohn
(74) Attorney, Agent, or Firm—Workman Nydegger

(57) ABSTRACT

A system and method for self-diagnosing a likely cause of a system crash is disclosed. A mechanism within an operating system checks for the existence of a stop code at startup of the machine. The existence of the stop code indicates that the system crashed during the previous session, and the type of system crash. The mechanism may read the stop code and implement a self-diagnostic procedure that corresponds to that stop code. In this manner, the mechanism may automate many of the tasks normally performed by humans, such as a system administrator, to self-diagnose the likely cause of the crash. If the crash occurs again, the mechanism, through the tracking procedures automatically implemented, may identify and report to a system administrator the likely cause of the crash, e.g. the particular faulty driver or configuration error.

24 Claims, 13 Drawing Sheets

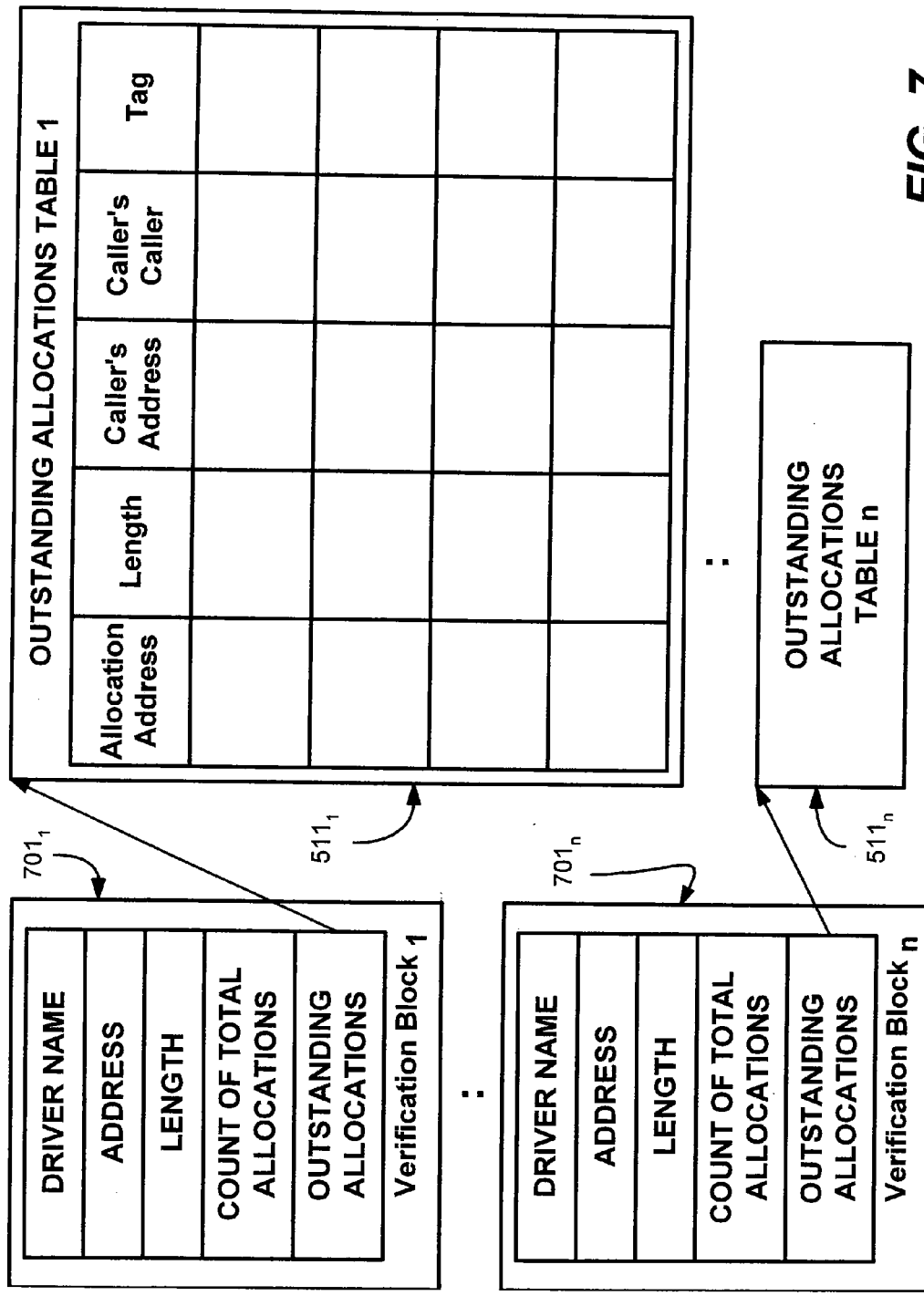

SYSTEM AND METHOD FOR SELF-DIAGNOSING SYSTEM CRASHES

1. CROSS-REFERENCE TO RELATED APPLICATIONS

This application is a continuation of U.S. application Ser. No. 10/808,877 filed Mar. 23, 2004 now U.S. Pat. No. 7,127, 642, and entitled "SYSTEM AND METHOD FOR SELF-DIAGNOSING SYSTEM CRASHES", which is a continuation of U.S. Pat. No. 6,728,907, filed Apr. 14, 2000, and entitled "SYSTEM AND METHOD FOR SELF-DIAGNOSING SYSTEM CRASHES". This application is also related to U.S. Pat. No. 7,111,307 issued Sep. 19, 2006, and entitled "METHOD AND SYSTEM FOR MONITORING AND VERIFYING SOFTWARE DRIVERS USING SYSTEM RESOURCES INCLUDING MEMORY ALLOCATION AND ACCESS", as well as U.S. application Ser. No. 11/479, 268, filed Jun. 30, 2006, and entitled "METHOD AND SYSTEM FOR MONITORING AND VERIFYING SOFTWARE DRIVERS". All of the foregoing applications and patent(s) are incorporated herein by reference.

2. BACKGROUND AND RELEVANT ART

Today, diagnosing a computer system crash (due to operating system or device driver software bugs, hardware errors, configuration problems, or the like) is a very time consuming and expensive process. Typically, a system administrator or developer is left to access books, websites, or colleagues, and often resorts to trial and error to determine what exactly caused the system crash. The diagnosis is generally manual and involves setting particular diagnostic configurations, rebooting the system (likely many times), manually evaluating the diagnostic results, and attempting to reproduce the crash.

In some operating systems, when a crash occurs, a dump file may capture the operating state of the computer at the time of the crash. The traditional dump file helps solve the mystery of what caused the crash, but is typically a very large file. For instance, large systems may have several gigabytes of memory. Writing out the traditional dump file may take upwards of thirty minutes on such a system. Users typically disdain that much down time, and administrators prefer to avoid such time-consuming steps toward diagnosing the system crash.

Moreover, as suggested above, using the information stored in the dump file has traditionally been a time-intensive, manual process. A system administrator or developer is left to read many lines of information in an attempt to determine what caused the crash. Hours of human intervention may be spent simply identifying the diagnostic steps to be taken in search of the offending component that caused the crash.

Further complicating the diagnosis of system crashes is that they are often difficult to reproduce. For example, a device driver may have a bug that does not arise unless memory is low, and then possibly only intermittently. In that case, a test system may not be able to reproduce the error because it does not reproduce the conditions.

In sum, diagnosing system crashes has long vexed system administrators and users of computing systems. A system that overcomes the problems identified above has eluded those skilled in the art.

3. BRIEF SUMMARY

Briefly described, the present invention provides a system and method for self-diagnosing system crashes by identifying a type of system crash that occurred, and automatically taking diagnostic steps based on that type of crash. The invention may make use of a stop code contained in a memory dump file stored in response to the system crash. Preferably, the invention makes use of a "minidump" that contains an intelligently selected subset of the available pre-crash computer information, including the stop code that identifies the particular type of crash that occurred.

In one implementation, a mechanism of an operating system is configured to write an abbreviated dump file of a selected portion of the system memory at the time of a system crash. For example, a "crash driver" may be implemented that, when instructed by the operating system, reads from system memory certain information considered to be likely the most relevant to the diagnosis of a system crash, and writes that information to the dump file. Typically, a component of the operating system (e.g., a memory manager component) identifies the occurrence of a system fault, such as corrupt or exhausted memory, and informs the operating system that the system crash has occurred. In response, the crash driver may be instructed to write the dump file so that the crash may be diagnosed.

In accordance with an aspect of the invention, another mechanism within an operating system, such as a memory management component of a system kernel, checks for the existence of the dump file at each startup of the machine. The existence of the dump file may indicate that the system crashed during the previous session. The existence of the dump file is but one technique that may be used to determine that a system crash occurred, and is only given as an example. In any case, once the occurrence of the system crash has been discovered, the mechanism of the invention analyzes the dump file to determine what type of crash occurred (e.g., out of memory or corrupt memory), and implements a self-diagnostic routine or procedure corresponding to the type of crash. More particularly, the mechanism may read the stop code from the dump file and implement a self-diagnostic procedure that corresponds to that stop code.

Through the described construct, the mechanism self-diagnoses the likely cause of the crash by automating many of the tasks normally performed manually. If the crash occurs again, the mechanism identifies, through the self-diagnostic procedures automatically implemented, the likely cause of the crash, e.g. the particular faulty driver or configuration error, and may report that information to a system administrator. This significantly simplifies the corrective measures that typically need to be taken by system administrator or the like to correct the fault. Moreover, the self-diagnostic procedure may enable special code to provoke the problem into reoccurring sooner, and, more importantly, to also catch it before it causes too much damage so the culprit can be easily identified. And still further, the invention enables non-experts to quickly diagnose and resolve computer problems, thereby ameliorating both the cost and delay of finding an "expert."

In accordance with another aspect of the invention, during startup, the mechanism may change the stop code stored in the dump file to avoid a situation where the system suffers another, different type of crash before the mechanism is able to address the first crash (such as later in the startup process). These and other aspects of the invention, together with the benefits and advantages realized, will become apparent from a reading of the following detailed description in conjunction with the drawings, in which:

4. BRIEF DESCRIPTION OF THE DRAWINGS

FIG. 7 is a representation of data structures uses to track memory allocations and deallocations to diagnose a particular type of system crash;

5. DETAILED DESCRIPTION

Exemplary Operating Environment

Figure 1:
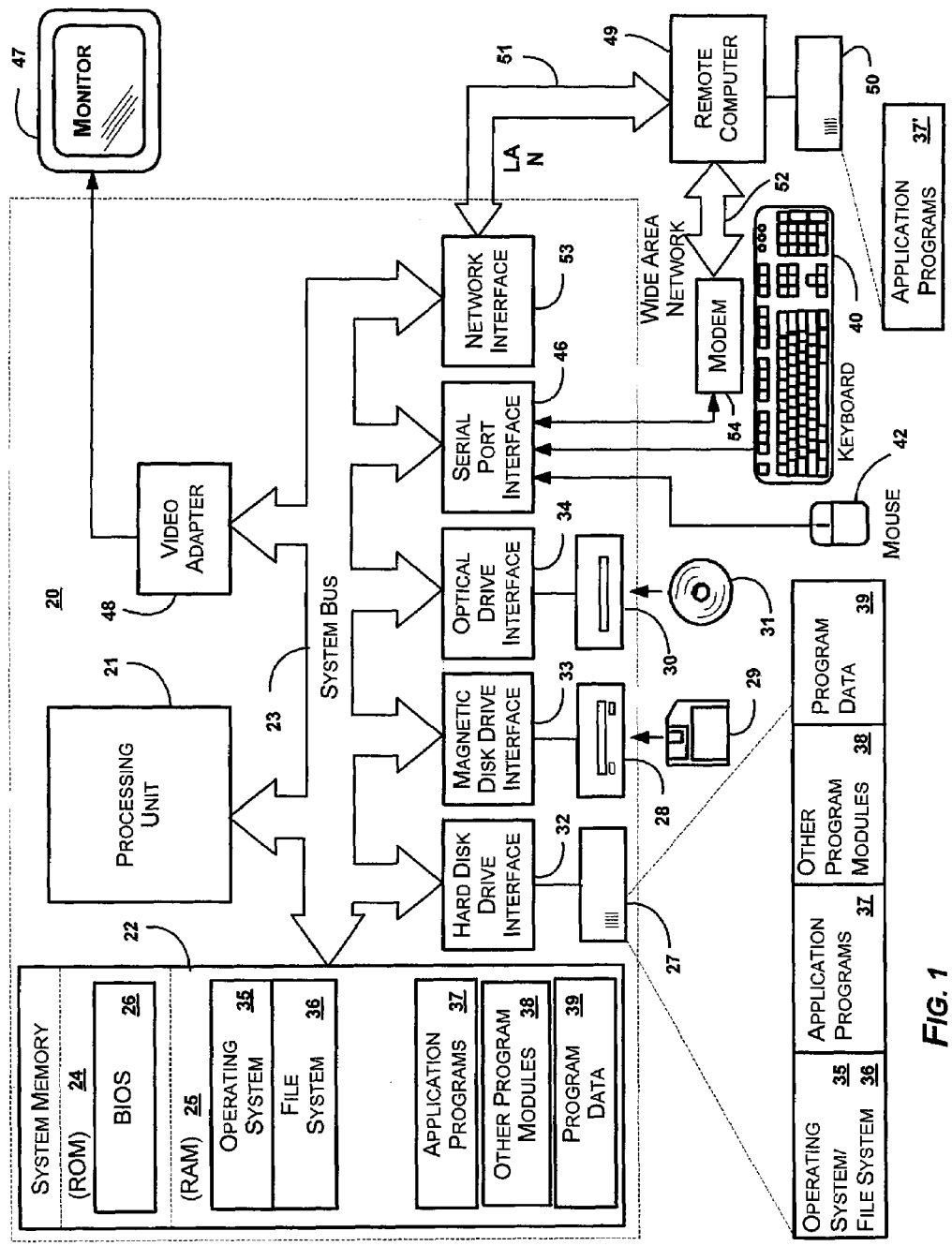
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 2T, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably the Windows® 2000 operating system). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Illustrative Self-Diagnostic System

Figure 2:
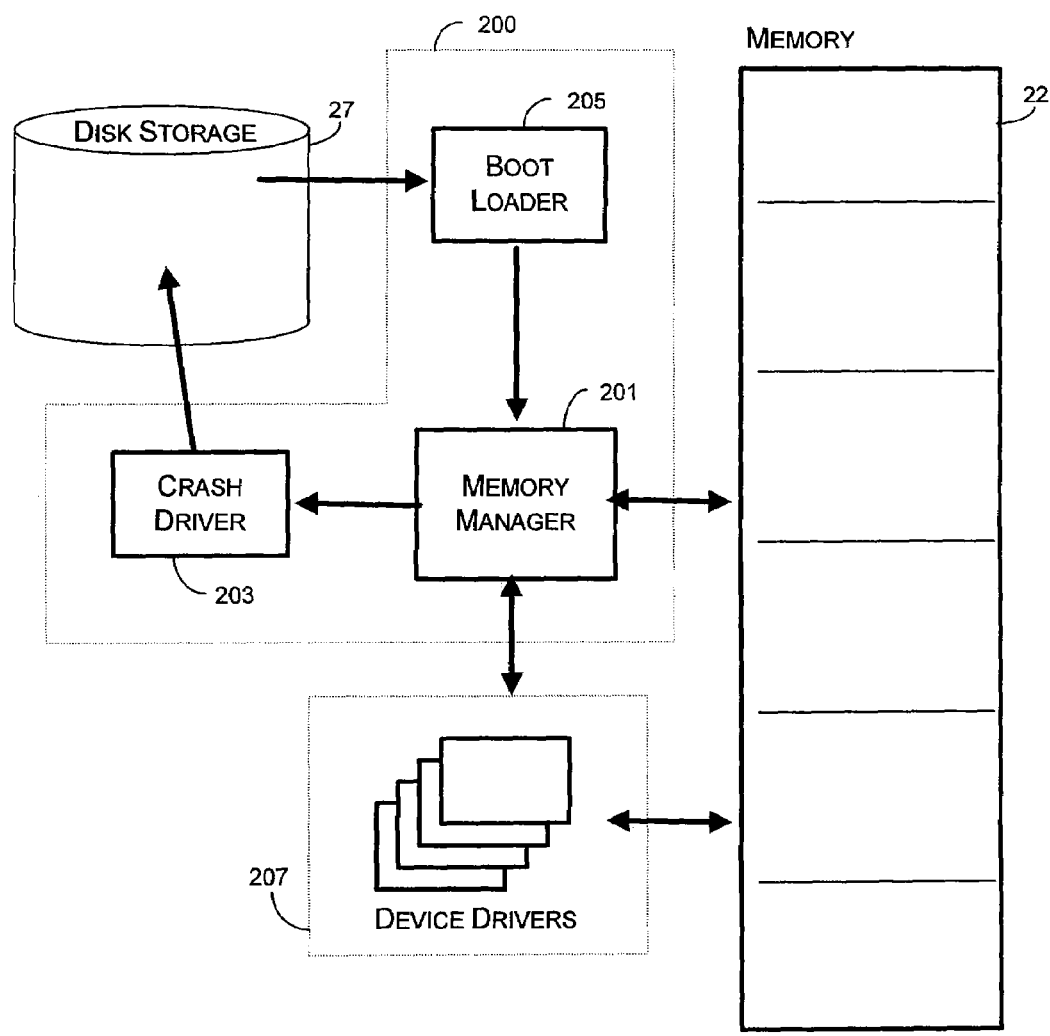
FIG. 2 is a functional block diagram representing a self-diagnostic system capable of being used in conjunction with the computer system of FIG. 1 and in which the present invention may be embodied.

FIG. 2 is a functional block diagram that, together with the following discussion, provides a general description of an illustrative self-diagnostic system 200 constructed in accordance with the present invention. Components of an illustrated embodiment of the system 200 include a memory manager 201, which may be a kernel-mode component of the operating system 35, a crash driver 203, and a boot loader 205. Also illustrated are one or more kernel-mode device drivers 207, a non-volatile storage device, such as the hard disk 27, and several pages of the system memory 22. The several components of the system 200 are illustrated as separate from the system memory 22 for clarity of explanation, but those skilled in the art will appreciate that those components may reside within the system memory 22 during execution.

The memory manager 201 of the described embodiment is a kernel-mode operating system component that (among other things) implements on-demand-paged virtual memory. The memory manager 201 allocates and deallocates memory, pages data into and out of physical memory (from and to a disk) as memory demands dictate, and generally maintains the flow of data into and out of system memory 22. The memory manager 201 performs such tasks to make it appear to other software components, such as application programs 37 or the drivers 207, that there is more memory available (e.g., four gigabytes of virtual memory) than the physical random access memory actually installed on the computer 20 (e.g., 128 megabytes of RAM). For example, when a driver needs memory, it requests a certain amount from the memory manager 201, which then allocates the memory (if available) to the driver. The memory manager 201 may trim data stored in the allocated memory to hard disk if not actively used by the driver, thereby freeing the physical memory for use by another component until again used by the driver.

The crash driver 203 is a special type of system driver that is responsible for writing a dump file to the hard disk 27 in the event of a system crash. More specifically, if the memory manager 201, or some other component of the operating system 35, identifies a system memory fault, that component instructs the crash driver 203 to read selected data from memory 22 and write that data to the hard disk 27 as the dump file. The crash driver 203 is provided a stop code by the operating system 35 that indicates a particular type of fault that led to the system crash. For example, an out-of-memory fault may correspond to one stop code, while a corrupt-memory fault may correspond to another stop code. The component that identifies the system memory fault may provide the stop code to the crash driver 203. Although briefly described here, further discussion of the crash driver 203 and the method of creating the dump file can be found in U.S. Pat. No. 7,028,056, issued on Apr. 11, 2000, entitled "Methods and Arrangements for Generating Debugging Information Following Software Failures," assigned to the same assignee as the present patent application, and incorporated herein by reference.

The boot loader 205 is a component of the operating system 35 that contains the code used to load the operating system 35 into RAM 25 at system start up. In one embodiment, the boot loader 205 is configured to query for the existence of the dump file in a particular location on the hard disk 27. For instance, if the crash driver 203 is configured to write the dump file to a pagefile on the hard disk 27, the boot loader 205 is configured to read the dump file from the pagefile at start up. In this embodiment, the existence of the dump file indicates to the boot loader 205 that the system crashed during the previous session. Other mechanisms may alternatively be used to indicate the occurrence of the system crash, such as a status bit or code that is tested at each start up, or any other technique. The boot loader 205 is further configured to extract the stop code and other pertinent information from the dump file and pass it to the memory manager 201 early in the boot process (i.e., prior to loading any device drivers 207). In that way, the memory manager 201 knows the type of crash that occurred and may take action (as described below) prior to starting any drivers.

The device drivers 207 are software components that make use of the system memory 22 to perform varied tasks associated with the operation of the computer system 20. Often device drivers are associated with hardware devices, such as a hard disk driver or sound card driver. However, some device drivers perform specialized functions and are not associated with a particular hardware device, such as an antivirus driver or a file encryption driver. The device drivers 207 interface with the memory manager 201 to request the allocation, deallocation, and general maintenance of memory 22. Very often device drivers are kernel mode components that execute with a privileged status, which provides them with certain access privileges to otherwise protected memory that results in improved efficiency and performance. However, an ill-behaved device driver executing with privileged status can cause system crashes by improperly accessing or maintaining memory 22. Often, the memory manager 201 can detect that an errant device driver caused a memory fault, but cannot detect specifically which device driver 207 caused the fault, leading to the need to diagnose the system crash to identify the errant driver.

Figure 3:
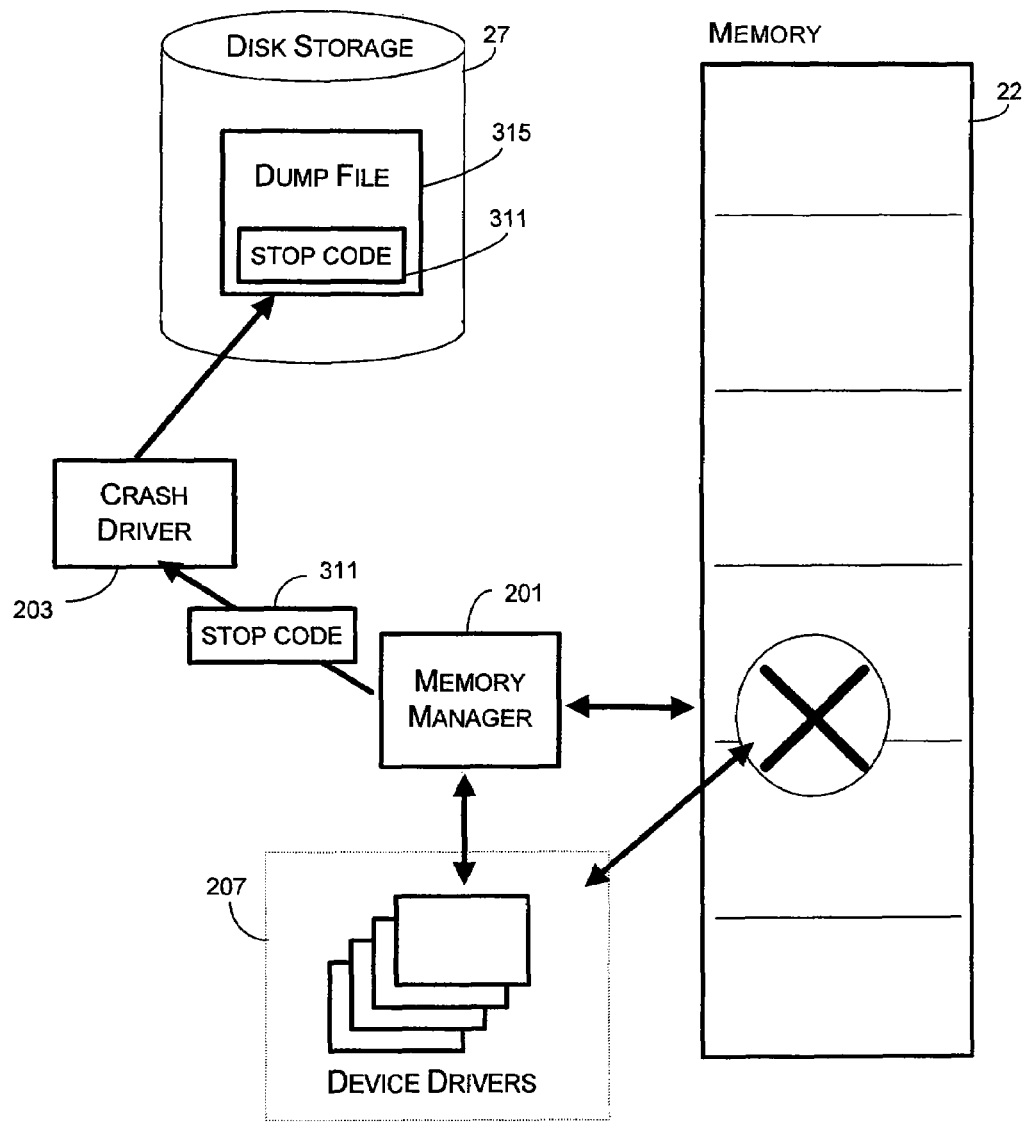
FIG. 3 is a functional block diagram illustrating components of the self-diagnostic system used to detect and identify a system crash, and to store information to self-diagnose the cause of the system crash, in accordance with one aspect of the present invention.
Figure 4:
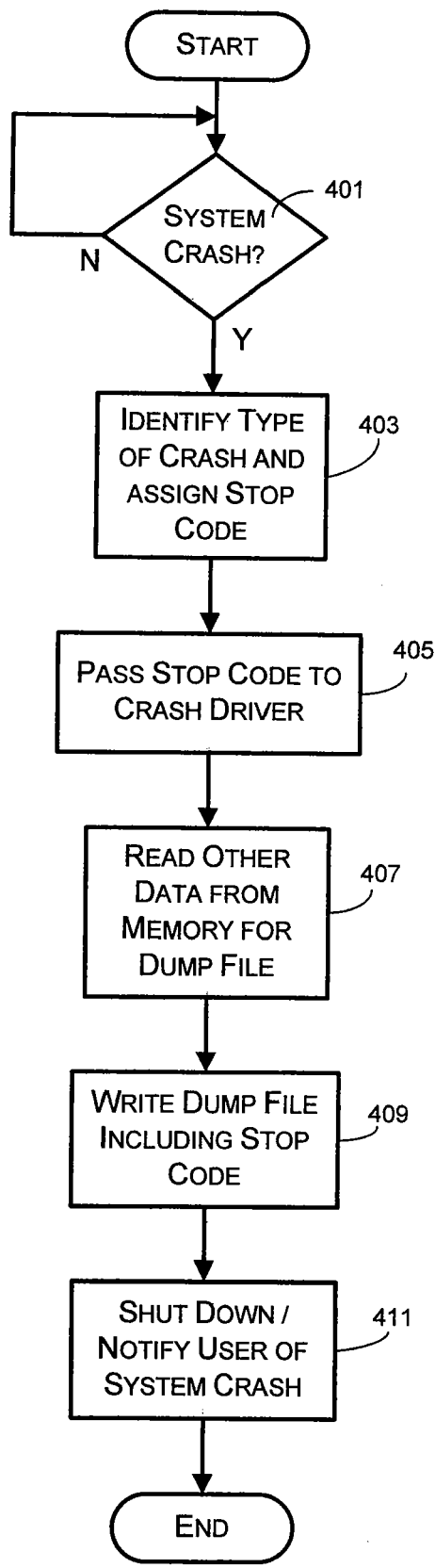
FIG. 4 is a logical flow diagram illustrating a process performed by the system illustrated in FIG. 3 to detect and identify the system crash, and to store information to self-diagnose the cause of the system crash, in accordance with one aspect of the present invention.

FIG. 3 and FIG. 4 are a functional block diagram and a logical flow diagram, respectively, that together generally illustrate how the system 200 may detect and identify a system crash, and store information used by the system 200 to self-diagnose the cause of the system crash. To begin, as represented by block 401 of FIG. 4, the system 200 performs normally, meaning that ordinary memory maintenance and accesses occur, until a system crash is detected by the operating system 35, such as by the memory manager 201. When a system crash is detected (e.g., a memory fault), at block 403 the memory manager 201 identifies the type of crash that occurred and assigns a stop code 311 (FIG. 3) to that type. For instance, if the memory manager 201 detects a dangerously-low memory condition resulting from a device driver failing to release unneeded memory allocations, the memory manager 201 identifies the particular stop code 311 associated with that crash type. The memory manager 201 may refer to a lookup table or other listing that maps stop codes to memory faults or other crash types.

At block 405, the memory manager 201 indicates the occurrence of a system crash to the crash driver 203, such as by passing the stop code 31T1 to the crash driver 203. Other techniques may equally be used to inform the crash driver 203 of the crash.

At block 407, once the crash driver 203 has the stop code 311 and has been informed of the crash, the crash driver 203 reads certain data from memory 22 to capture the state of the system at the time of the crash. The data read from memory 22 is selected to allow effective analysis and diagnosis of the crash. Further detail on the selected data and the operation of the crash driver 203 may be found in the aforementioned U.S. patent application Ser. Nos.

At block 409, the crash driver 203 writes the dump file 315 to the hard disk 27. In an embodiment described herein, the crash driver 203 writes the dump file 315 to a particular location on the hard disk 27, such as a pagefile or other known location on the hard disk 27. In that way, the existence of the dump file 315 may be easily verified during a subsequent start up operation. The stop code 311 is included within the dump file 315 when written to the hard disk 27. Alternatively, the stop code 311 may be written to the hard disk 27 or pagefile separately from the dump file 315.

At block 411, after the stop code 311 has been written to the hard disk 27, the operating system 35 may shut down the computer system 20 or otherwise notify the user of the system crash. In some situations, the operating system 35 may be able to avoid completely shutting down the computer system 20 despite the crash, such as by terminating certain executing applications or processes that are affected by the crash. In other situations, the operating system 35 will prompt for (or otherwise cause) a reboot of the system, such as the case where operating system information has been corrupted by the crash. At this juncture, the dump file 315 and the stop code 311 have been saved to the hard disk 27, and the system 200 is prepared to self-diagnose the cause of the crash in accordance with one aspect of the present invention.

Figure 5:
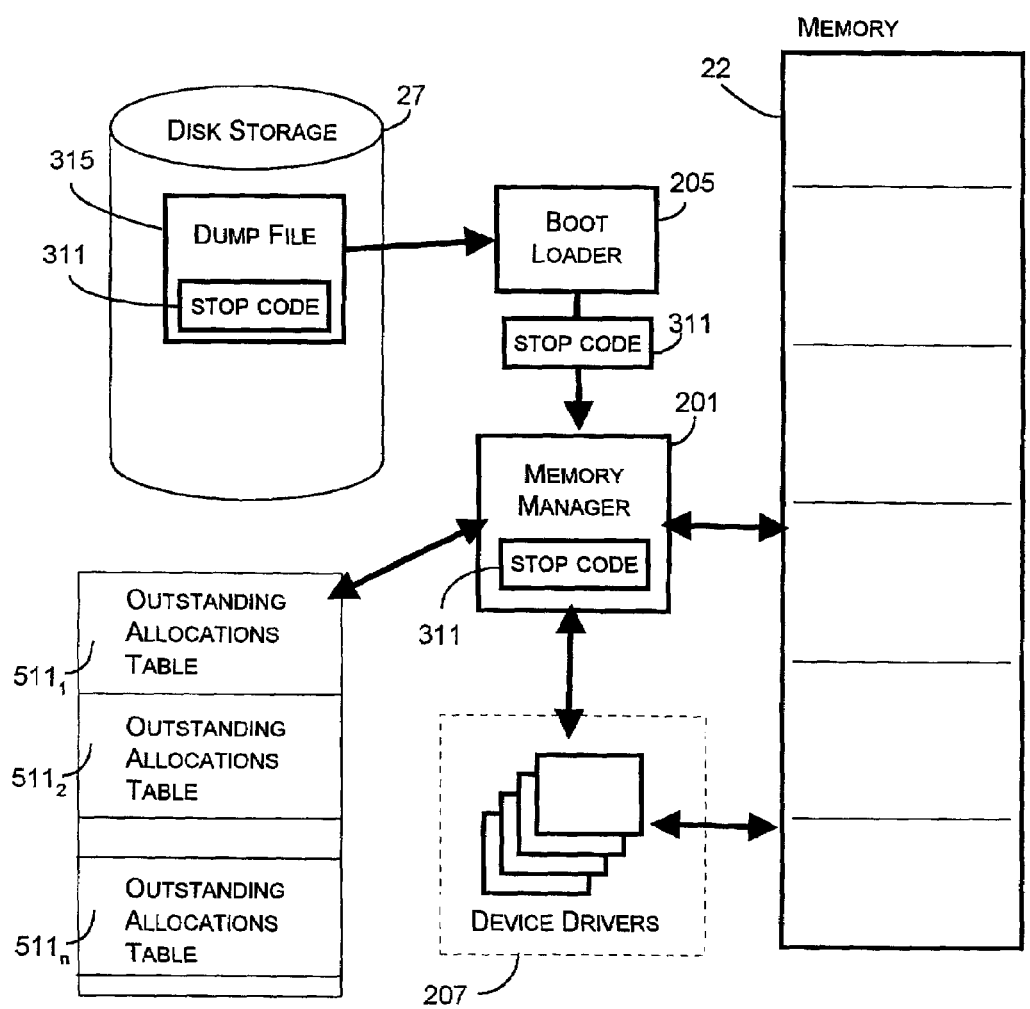
FIG. 5 is a functional block diagram illustrating components of the self-diagnostic system configured to detect the occurrence of a previous system crash, and to self-diagnose the cause of the system crash, in accordance with one aspect of the present invention.
Figure 6A:
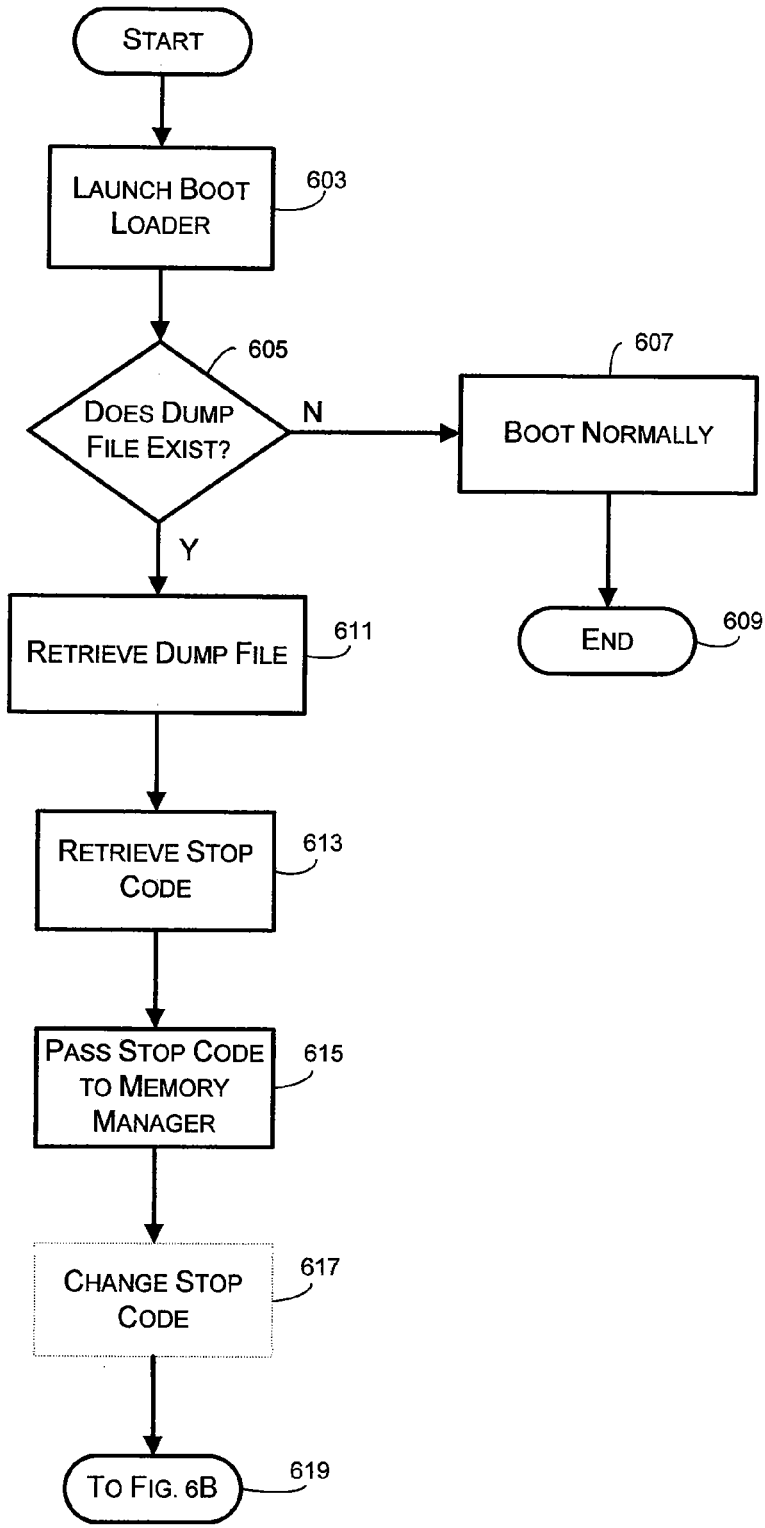
FIGS. 6A and 6B are logical flow diagrams generally illustrating a process performed by the components of FIG. 5 to detect and self-diagnose a system crash, in accordance with one aspect of the invention.
Figure 6B:
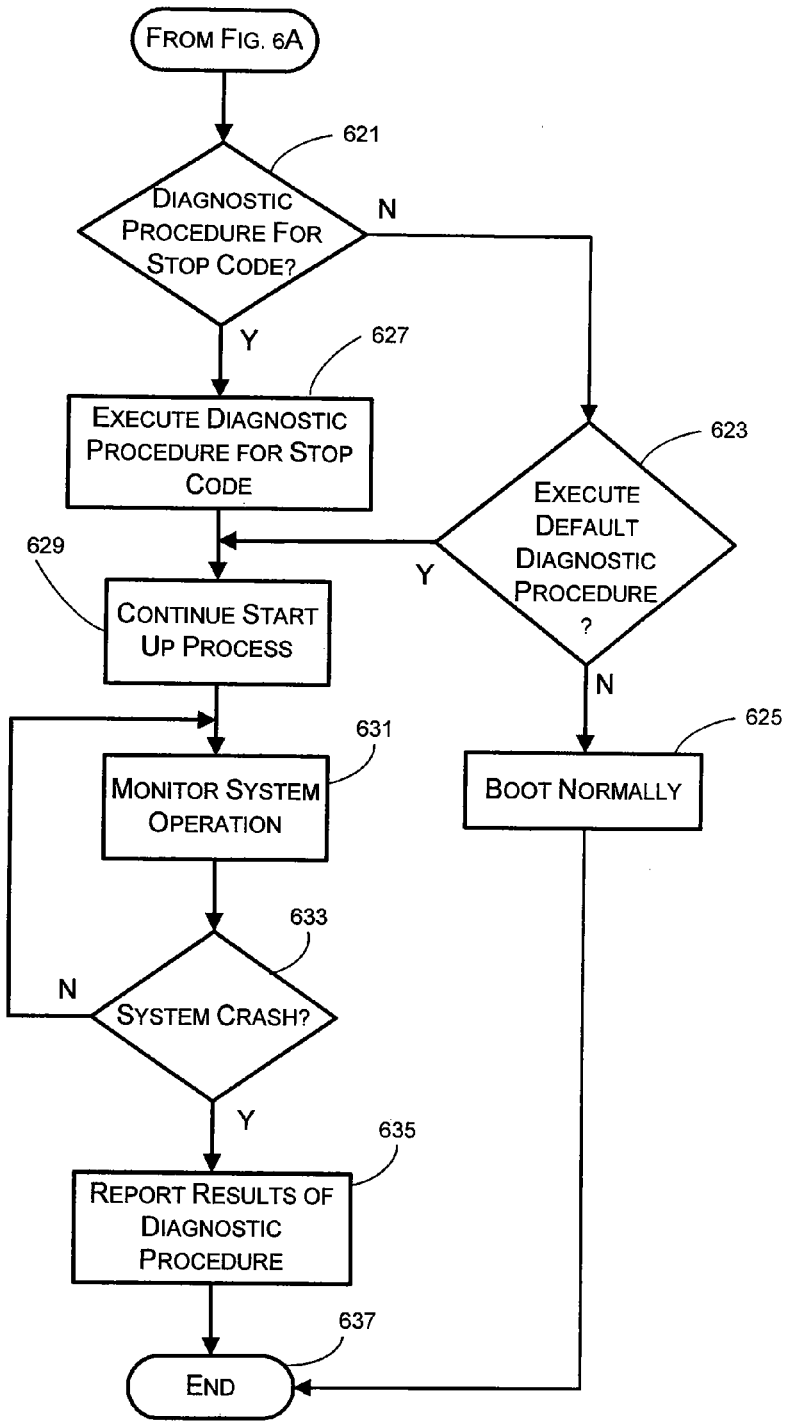

FIG. 5 is a functional block diagram and FIGS. 6A and 6B are logical flow diagrams that, taken together, generally describe how the system 200 determines that self-diagnosis is appropriate, and how the system 200 performs the self diagnosis. As represented in FIG. 5, during system boot, the boot loader 205 is launched to load the operating system 35 into memory 22. In an embodiment of the invention described herein, at block 603, the boot loader 205 checks for the existence of the dump file 315 on the hard disk 27 to determine whether the system crashed during the previous session. As mentioned above, the dump file 315 may be stored in a page file on the hard disk 27 so that it may be easily located by the boot loader 205 at start up.

At decision block 605, a test is made to determine whether the dump file exists. If the dump file does not exist, the process illustrated in FIG. 6A proceeds to block 607, where the system continues to boot normally, and the boot process effectively terminates at ending block 609. If however, the dump file 315 does exist, the system suffered a crash during the previous session, and the process illustrated in FIG. 6A continues to block 611.

At block 611, the boot loader 205 retrieves the dump file 315 from the hard disk 27. As discussed above, the dump file 315 may reside in a pagefile or some other known location on the hard disk 27 for easy location by the boot loader 205. At block 613, the boot loader 205 retrieves the stop code 311 from the dump file 315, and, at block 615, passes the stop code 311 and the contents of the dump file 315 to the memory manager 201.

The process continues at decision block 621 illustrated in FIG. 6B, where the memory manager 201 determines if a corresponding diagnostic procedure exists for the stop code 31T1. Note that all possible system crashes for which a stop code exists may not have a corresponding diagnostic procedure. Thus, if the stop code 311 does not have a corresponding diagnostic procedure, the memory manager 201 may either execute a default diagnostic procedure (as illustrated by "Yes" branch of the decision block 623), or proceed to boot normally at block 625. If a default diagnostic procedure is executed, the process may continue to block 629.

If at block 621 a corresponding diagnostic procedure exists for the stop code 311, at block 627, the memory manager 201 executes the diagnostic procedure for the stop code 311. The diagnostic procedure may include first ensuring that the computer system, including any device drivers and configuration settings, is still in the same configuration as before the crash, in case an administrator or other person identified and remedied the cause of the crash prior to the first post-crash reboot. The memory manager may verify this by comparing the list of components in the dump file 315 with those in the currently-running system. If the system is still in the same configuration, the memory manager 201 modifies certain system variables (identified by the diagnostic procedure) to enable appropriate switches (e.g., debug/tracking/sandboxing/driver verification switches) and the like, for the particular stop code 311. With any appropriate system variables set, the particular driver that caused the previous crash likely will be identifiable upon the next crash because it will typically be caught by these safeguards much sooner, as described below.

At block 629, the system continues the start-up process until the operating system 35, the device drivers 207, and any other appropriate software modules have been loaded into system memory 22. At this juncture, the computer system 20 is ready for use, and the diagnostic system 200 is prepared to identify the cause of the previous system crash in the event that it reoccurs.

At block 631, the memory manager 201 monitors the system operation in accordance with the system variables set at block 627. For example, the memory manager 201 may maintain an allocation table 511 that tracks particular types of memory usage by the device drivers 207. To this end, as generally represented in FIG. 7, the memory manager 201 may maintain a verification block (e.g., $701_1$-$701_n$) that points to an outstanding allocation table (e.g., $511_1$-$511_n$) for each driver that requests or performs a particular type of memory operation if the previous crash resulted from that type of memory operation (as identified by the crash code 311). As generally represented in FIG. 7, the verification block (e.g., $701_1$) comprises driver information including a count of the total allocations for this driver. Other information may be maintained in the verification block, such as various allocation information for this driver. The verification block $701_1$ also includes a pointer to the outstanding allocations table $511_1$ set up for a corresponding driver. The outstanding allocations table $511_1$ tracks specific information about each pool allocation that the driver has been given that remains outstanding, i.e., has not yet deallocated. The information may include the allocation's virtual address, length, and information useful in debugging such as per-process caller information and the tag of the driver that allocated the memory, e.g., "TCP" for TCP/IP drivers.

Thus, for each memory allocation to a driver, the memory manager 201 may include an entry in the allocation table (e.g., $511_1$) associated with that driver that requests or performs a particular type of memory operation if the previous crash resulted from that type of memory operation (as identified by the crash code 311). In that way, when the crash reoccurs, the allocation tables $511_1$-$511_n$ will likely identify which driver, drivers, or other software program being tracked is the offending culprit. Note that it is alternatively feasible to determine from the various counts if a given driver is consuming inordinate amounts of memory.

The system continues operating and the memory manager 201 continues monitoring the system operation until, illustrated by decision block 633, the system crash reoccurs and the process proceeds to block 635. When the system crashes again, the process illustrated in FIG. 6B moves to block 635. At block 635, the diagnostic mechanisms employed by the memory manager 201 contain an identification of each driver or software module that has outstanding memory operations of the type identified by the stop code 311. For example, if the stop code 311 indicates that the previous system crash occurred as a result of low memory, the allocation table 511 may indicate the drivers that had allocations and details about those allocations at the time of the crash. Thus, the memory manager 201 reports the results of the diagnostic procedure to the user or system administrator in the form of a printout or summary of the allocation tables, or any other form of report. In this manner, the user or system administrator may evaluate the results to help determine which driver or software component in the computer system caused the crash. For instance, in the illustrated example, one of the drivers may be associated with a much larger number of allocated pages at the time of the second crash relative to other drivers. That information indicates to the user or system administrator that that driver is likely the cause of the crash, and should be perhaps replaced or further tested. Thus, the system 200 is able to self-diagnose the cause of the previous system crash, and upon a subsequent crash, provide the user or system administrator with an identification of the likely culprit behind the crash.

To help further clarify the operation of the disclosed self-diagnostic system, the following discussion provides several specific examples of types of system crashes that may occur, and how the system 200 illustrated above may self-diagnose those types of crashes. The examples fall into two broad categories, out-of-memory/resources crashes and corrupt-memory crashes.

Out-of-Memory/Resources System Crashes

The first category of system crashes deals with a failure of a software component, such as a device driver, to deallocate memory resources that the component no longer needs, often referred to as a "memory leak." Memory leaks can occur, for example, if a driver unloads but still has allocated memory, or even when a driver is loaded but for some reason does not deallocate unneeded memory. Memory leaks can be difficult to detect, as they slowly degrade machine performance until an out-of-memory error occurs.

Figure 8:
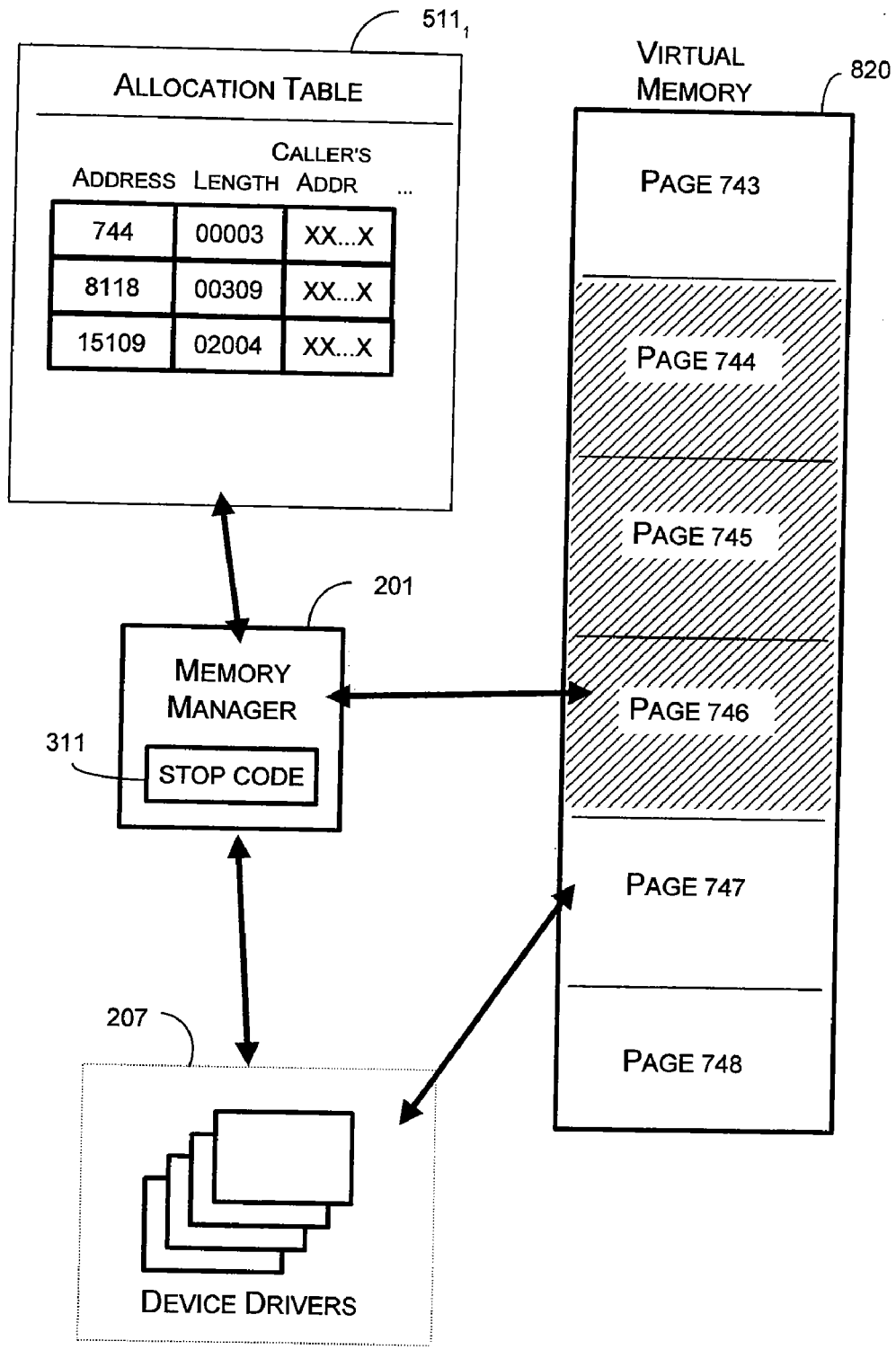
FIG. 8 is a functional block diagram illustrating a type of system crash resulting from exhaustion of virtual memory, and components of the self-diagnostic system used to diagnose it.

FIG. 8 is a functional block diagram illustrating one example of a stop code and illustrative self-diagnostic procedure that involves a crash due to allocated pages in memory not being deallocated. FIG. 8 illustrates the above-described out-of-memory error that involves the failure of a driver to properly deallocate its allocated memory when no longer needed, (including when the driver is unloaded). As is known, a process (e.g., of a driver) may request that a block of virtual address pages be reserved for use by the process (or even for another process). In that case, the memory manager 201 selects a number of virtual memory addresses to satisfy the request, and reserves those pages to the process. However, if a driver process fails to release virtual addresses that the driver no longer needs, (including when the driver unloads with pages still allocated thereto), then the amount of available virtual memory in the system will slowly decrease until a low-memory situation occurs, leading to a system crash.

To address a system crash of that type, the memory manager 201, upon the next startup, may begin tracking (e.g., via allocation tables $511_1$-$511_n$) each request for and release of virtual memory. The memory manager 201 may track each driver that reserves memory pages, such as by adding an entry in the allocation table each time a device driver 207 issues a request to allocate memory, and by removing the entry if the device driver 207 later deallocates the memory. The entry includes information sufficient to properly identify which driver requested the memory, and may include additional information to aid diagnosis, such as the fields shown in FIG. 7, and the like. If the crash reoccurs, the various allocation tables can be examined to identify which driver or drivers (and/or processes thereof) appeared to have requested the allocation of virtual memory without appropriately deallocating those pages. For example, an unloaded driver may still have pages allocated thereto, or a driver has an inordinate amount of pages allocated thereto.

Figure 9:
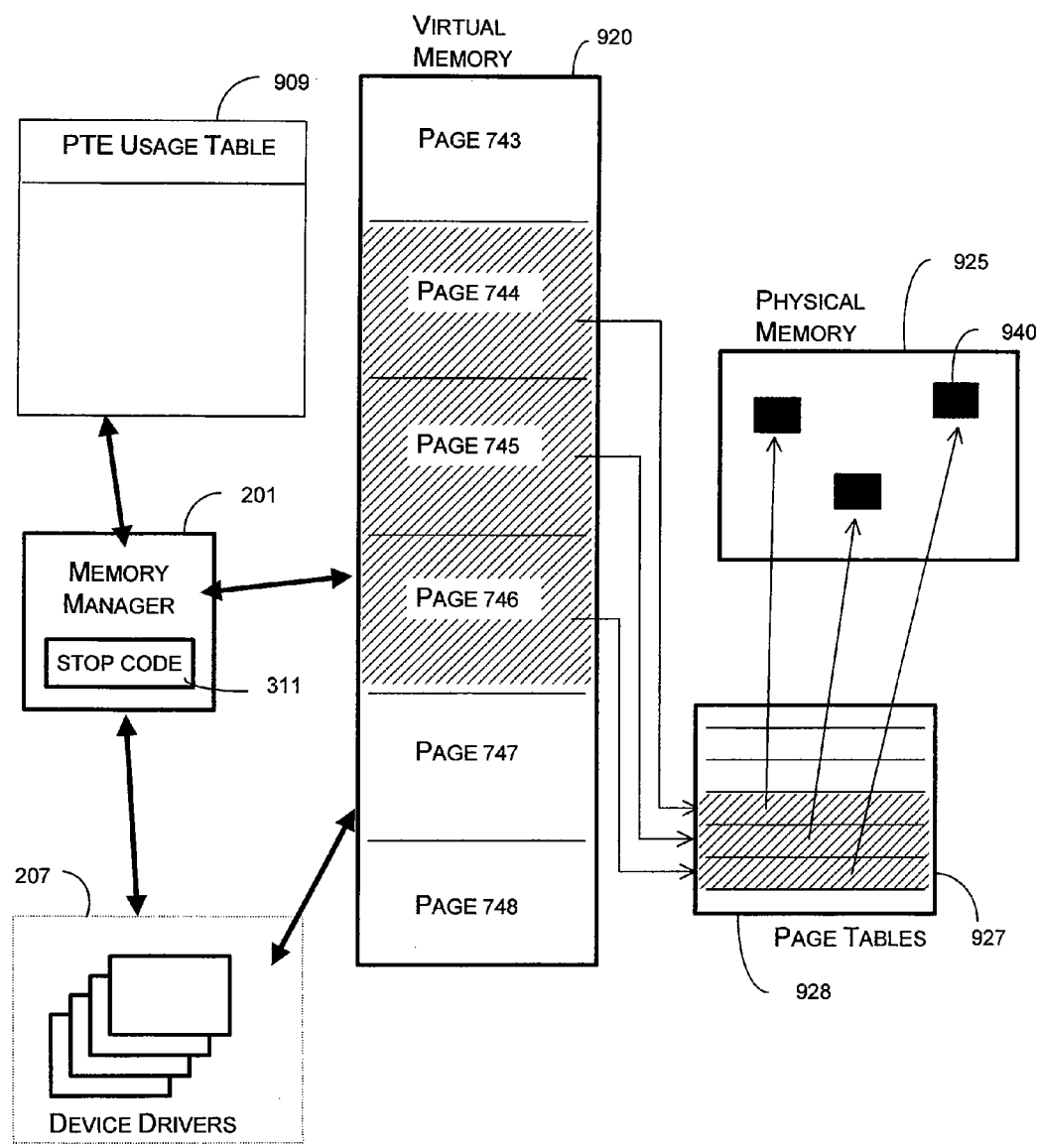
FIG. 9 is a functional block diagram illustrating a type of system crash resulting from exhaustion of virtual memory resources, and components of the self-diagnostic system used to diagnose it.

Another similar type of error, represented by FIG. 9, involves a crash due to available Page Table Entries (PTEs) being exhausted. As is known, when a device driver first accesses a virtual address previously allocated thereto, the memory manager 201 creates a page table entry (PTE), such as PTE 927, to map each virtual page (e.g., virtual page 746) to a location in physical memory (e.g., physical page 940). However, there are a limited number of PTEs that may be created or maintained by the memory manager 201. If a device driver fails to deallocate used memory and thereby cause the release the PTE when no longer needed, the result may be an exhaustion of available PTEs, leading to a system crash.

To address a system crash of that type, the memory manager 201, upon the next startup, may begin tracking (e.g., via a PTE usage table 909) each creation and release of PTEs in a manner similar to that described above for virtual memory pages. The memory manager 201 may track the usage of PTEs by each driver, such as by adding an entry in the allocation table each time a device driver 207 causes a PTE to be created, and by removing the entry if the device driver 207 later frees the memory corresponding to the PTE. The entry may include information sufficient to properly identify which driver requested the PTE, and may include additional information to aid in diagnosis, such as the number of PTEs created, the process of the driver that caused creation of the PTE, the process that called that process, a pointer to the memory descriptor list (MDL), and the like. If the crash reoccurs, the PTE usage table 909 can be examined to identify which driver or drivers had PTEs in use at the time of the crash. Thus, if a crash is resulting from a lack of available PTEs, the table 909 will likely identify which driver is using an inordinate amount.

Figure 10:
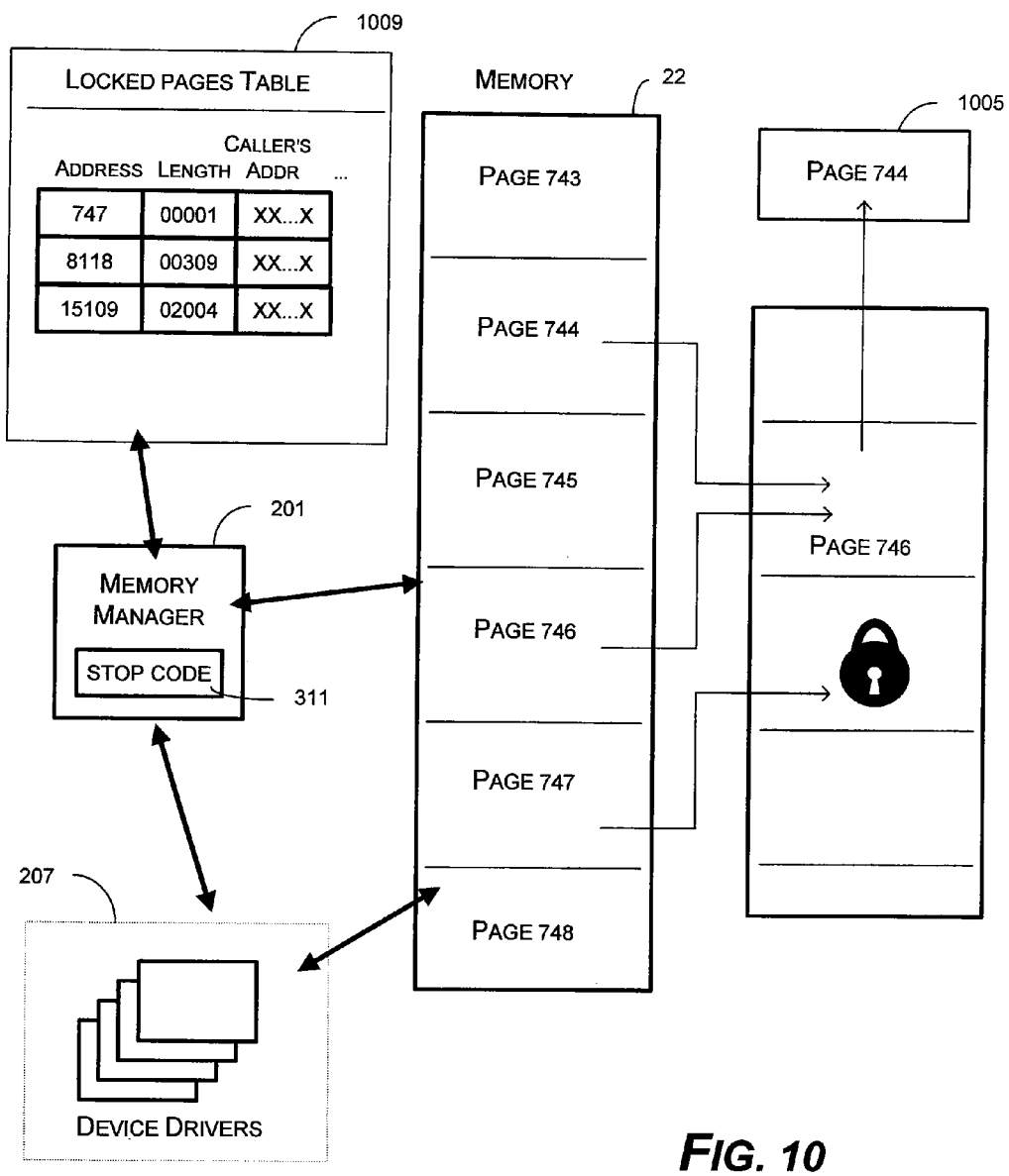
FIG. 10 is a functional block diagram illustrating a particular type of system crash resulting from locked pages not being released, and components of the self-diagnostic system used to diagnose it.

FIG. 10 is a functional block diagram illustrating an example of another stop code and illustrative self-diagnostic procedure that involves a crash due to locked pages in memory not being released. As is known in the art, certain memory pages allocated to a software component may be trimmed to a pagefile if not actively used. This allows more addressable memory (termed "virtual memory") to be available than the amount of physical memory actually available. For example, as illustrated in FIG. 7, virtual memory page 744 and virtual memory page 746 are logically mapped to the same physical memory location. However, in the illustrated example, virtual memory page 744 was not actively used and was consequently trimmed to the pagefile 705, (as flagged in the PTE therefor), whereby virtual memory page 746 may be actively used.

A driver may request that certain memory pages (e.g., virtual memory page 747) be locked in physical memory so that the information stored in those pages will not be trimmed to the pagefile 705. This is sometimes done by drivers or software components that need to access certain data as quickly as possible, or simply to maintain constant mappings of virtual addresses to physical addresses. Drivers are supposed to unlock any pages when it is no longer necessary that the pages remain locked. If a driver fails to do so, and/or even worse, continues to lock additional pages as they are used, over time the number of available physical pages of memory decreases until a low-memory error occurs, leading to a system crash.

In this case, as illustrated in FIG. 10, at system start up, the memory manager 201 detects, by the stop code 311, that the type of crash that occurred corresponds to locked pages not being released by a driver. Thus, the memory manager 201 may initiate a tracking procedure to track pages in memory as they are locked and unlocked. For instance, the memory manager 201 may create and write information to an allocation table 1009 that identifies each request by a driver for locked pages in physical memory. The memory manager 201 may use the allocation table 709 to track each driver that requests a locked page, such as by adding an entry in the table 1009 for each request, and by removing the entry if the device driver 207 frees the page. The entry includes information sufficient to properly identify which driver locked the page, and may include additional information to aid diagnosis, such as the same general information maintained for tracking virtual memory allocations in general, as described above. Alternatively, simple counts of the locked pages of each driver may be maintained, which may help identify an errant driver, although not necessarily pinpoint the problem within the driver The memory manager 201 continues to track the locked status of pages in memory until the crash reoccurs (or, perhaps, until turned off through some external mechanism). In this way, if the crash reoccurs, the allocation table 1009 contains an entry for each locked page in memory with sufficient information to identify each driver that has locked the page. In this way, a system administrator or other debugger can analyze the allocation table 1009, for example to identify which driver has an excessive number of locked pages, thus identifying the offending driver.

Corrupt Memory System Crashes

Another category of system errors that lead to crashes is corrupt-memory. One way in which a component can corrupt memory is related to the way in which pooled system memory is arranged and used. For many reasons, including performance and efficiency, a common pool of system memory is made available to kernel mode components. Pooled memory is allocated by the memory manager 201 as a block, (e.g., in multiples of thirty-two bytes), with a header (e.g., eight bytes) at the start of each block. For example, if forty-four bytes of pooled memory are required by a driver, sixty-four are allocated by the memory manager 201, eight for the header, forty-four for the driver, with the remaining twelve unused. Among other information, the header includes information that tracks the block size. Then, when the memory is deallocated, the memory manager 201 determines whether this block may be coalesced with any adjacent deallocated blocks, to make larger blocks of memory available for future requests. If so, the header information including the block size is used to coalesce the adjacent blocks.

While this technique is highly efficient in satisfying requests for memory allocations and then recombining deallocated memory, if an errant component, such as driver 1107, writes beyond its allocated memory block, it overwrites the header of the subsequent block. For example, if a driver requests twenty-four bytes, it will receive one thirty-two byte block, eight for the header followed by the requested twenty-four bytes. However, if the driver writes past the twenty-fourth byte, the driver will corrupt the next header, whereby the memory manager 201 may, for example, later coalesce the next block with an adjacent block even though the next block may be allocated to another component. As can be appreciated, a multitude of errors may result from the corrupted header.

To further complicate matters, the memory manager 201 or the component having the next block allocated to it (or even an entirely different component) will likely appear responsible for the crash. Indeed, this type of error can be very subtle, such as if the header corruption occurs long after the initial deallocation, possibly after many other components have successfully used the same memory location.

Another way in which an errant driver may crash the system is when a driver frees pooled memory allocated thereto, but then later writes to it after the memory has been reallocated to another component, corrupting the other component's information. This may lead to a crash in which the other component appears responsible. Indeed, this post-deallocation writing can be a very subtle error, such as if the erroneous write occurs long after the initial deallocation, possibly after many other components have successfully used the same memory location. Note that such a post-deallocation write may also overwrite a header of another block of pooled memory, e.g., when smaller blocks are later allocated from a deallocated larger block.

To address these types of errors the memory manager 201 may isolate the memory that is provided to a driver in response to a request for pooled memory. In other words, when memory corruption is suspected, the memory manager 201 does not actually give the active drivers (or a subset of the active drivers) memory from the pool upon request, but instead provides the memory from another special location. In one alternative, a "driver verifier" tool may be used to perform various tests on certain drivers loaded in the system to identify the offending driver, i.e., the driver verifier component may be turned on to monitor the actions of active drivers that make use of pooled memory. A preferred driver verifier mechanism is described in copending patent application Ser. No. 09/447,501 entitled "Method And System For Monitoring And Verifying Software Drivers," filed on Nov. 23, 1999, assigned to the same assignee as the present invention, and the disclosure of which is hereby incorporated by reference.

Figure 11:
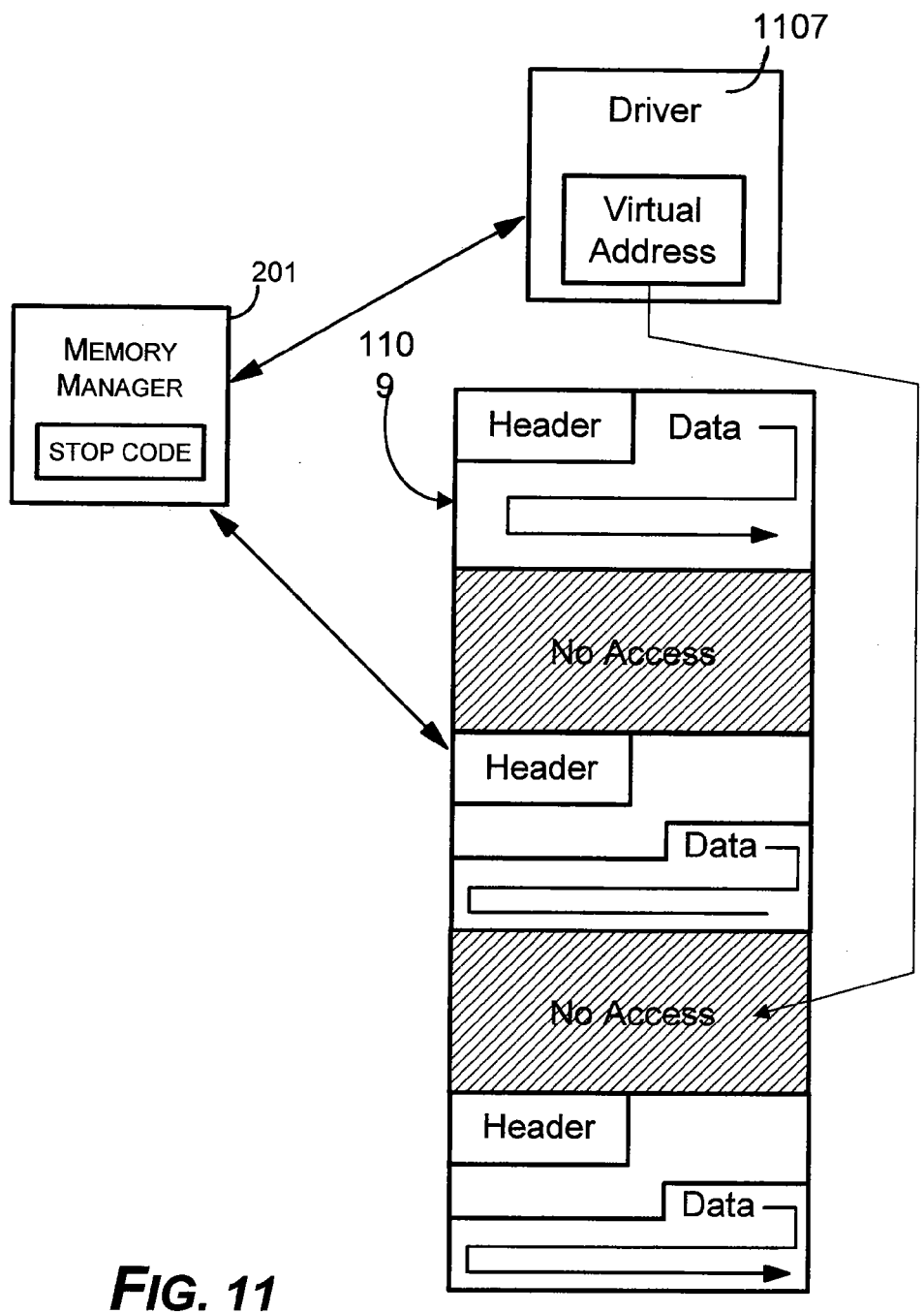
FIGS. 11 and 12 are functional block diagrams illustrating components of the self-diagnostic system used to diagnose various types of system crashes resulting from corrupt memory.

FIG. 11 is a functional block diagram illustrating a special memory structure 1109 that detects memory corruption. As generally represented in FIG. 11, one of the tests that may be performed is the detection of memory corruption via writing to a section not allocated to the driver, i.e., memory misuse by overruns and underruns. To detect memory corruption, the memory manager 201 allocates driver memory from the special, non-shared pool 1109, and monitors that pool for incorrect access. More particularly, when a driver-to-be-tested (e.g., 1107) requests pooled memory, the memory allocated to the driver 1107 is placed on a separate page (that is not pageable to disk). To this end, the memory manager 201 returns a virtual address to the driver 1107 that is the highest possible address which allows the allocation to fit on the page, in a virtual memory page pool 1109, whereby the allocated memory is aligned with the end of the page. The remainder of the page that precedes the data, if any, is written with random data, which may comprise a recorded pattern or the like to detect underruns.

To detect overruns, the previous page and the next page in the special page pool 1109 are marked inaccessible. Note that this is accomplished via virtual memory management, wherein each virtual address is associated with a page table entry which comprises a physical address to which the virtual address maps, along with bits that control page access. Thus, the surrounding pages are marked "No Access."

Attempts to access memory beyond the allocation buffer (within a page) are immediately detected as an access violation, as such an access is within the subsequent, "No Access" memory page. Note that writing before the beginning of the buffer will (presumably) alter the random data, and when the buffer is freed, this alteration will be detected. In either case, a bug check is issued, whereby the offending driver is identified in keeping with the present invention.

Note that underrun detection may be selected for drivers, such that the allocated memory is instead aligned with the beginning of the page. With this setting, underruns cause an immediate bug check, while overruns (may) cause a bug check when the memory is freed. In actual implementations, underrun errors tend to occur less often then overrun errors.

Figure 12:
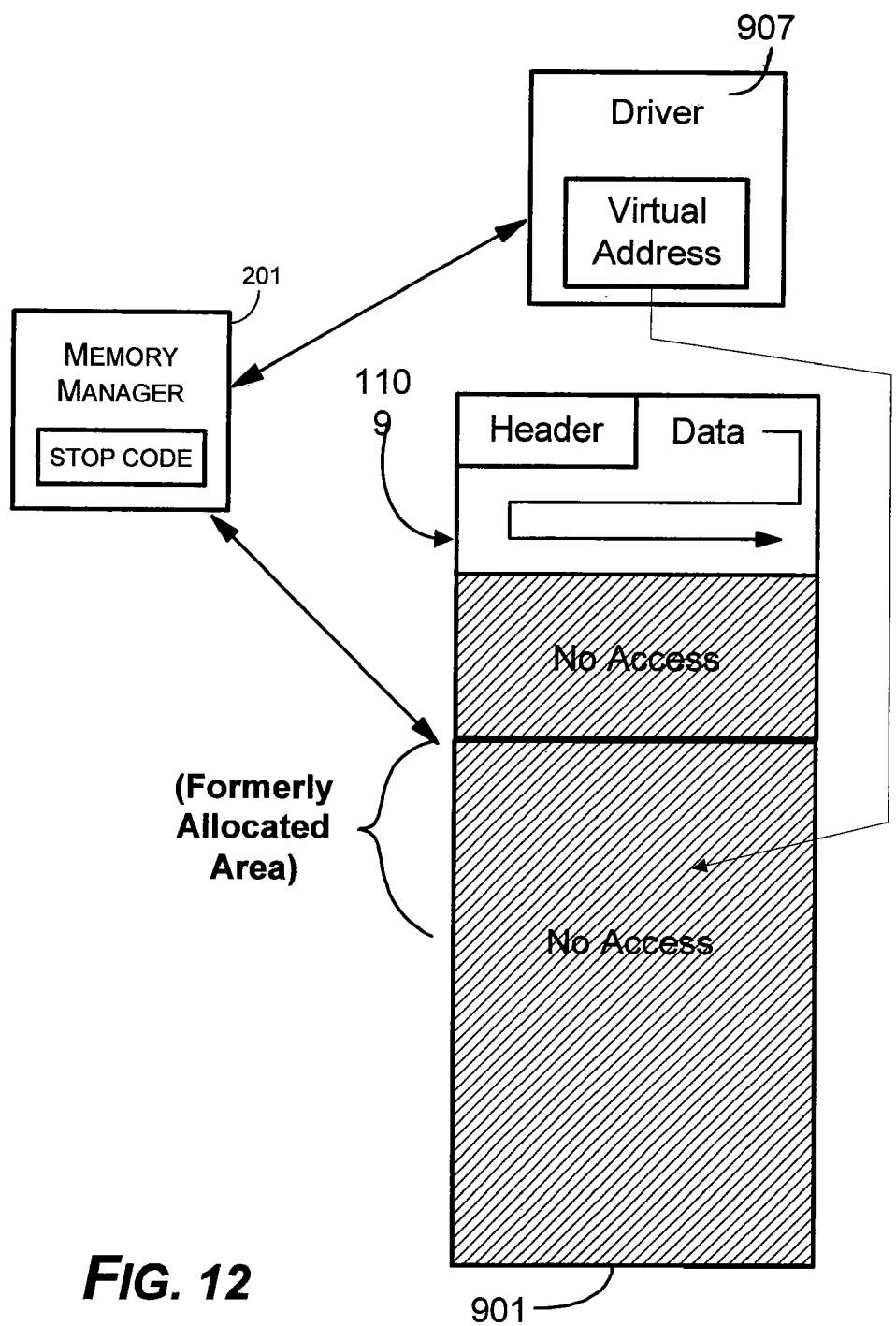

Another test of memory misuse that is performed is represented in FIG. 12, whereby when the driver 1107 deallocates memory from the special pool 1109, instead of freeing the virtual address space, the entire section is marked "No access." As a result, any subsequent read or write back to the formerly allocated area is also detected via an access violation. However, because memory space is finite, the system may needs to reuse the special pool 1109 at some time. To this end, the special pool is essentially arranged as a queue with respect to the deallocated pages. More particularly, once deallocated, a page is reused only after cycling through a large number (e.g., 50,000 or more) of allocations to other areas of the pool 1109. To this end, a pointer or the like to the appropriate virtual address in the pool 1109 may be maintained, e.g., to the address of the virtual next location in which space for allocating and bounding the allocated page is available. Note that a page that is still allocated and its surrounding "No Access" pages are skipped over such that only deallocated pages are reused.

While the invention is susceptible to various modifications and alternative constructions, certain illustrated embodiments are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer implemented method comprising:
performing ordinary error checking until a system crash of a particular type occurs; and
after the system crash, power on self tests, and initiation of booting to an operating system, executing instructions and automatically performing enhanced error checking including checking for memory corruption, the enhanced error checking performed depending on the particular type of system crash and operating to assist in locating instructions or software components that cause the system crash.

2. The method of claim 1, further comprising:
upon the system crash, storing a stop code that identifies the particular type of system crash; and
after the power on self test and the initiation of booting to an operating system, retrieving the stop code and determining the enhanced error checking to perform based on the stop code.

3. The method of claim 1, wherein the enhanced error checking is performed prior to a user diagnosis related to the system crash.

4. The method of claim 1, wherein the enhanced error checking is performed without a user diagnosis related to the system crash.

5. The method of claim 1, wherein the enhanced error checking further comprises checking resource-related operations.

6. The method of claim 5, wherein the resource-related operations comprise allocating and freeing memory.

7. The method of claim 6, wherein checking the resource-related operations further comprises tracking each allocation and freeing of memory performed by the least one process.

8. The method of claim 5, wherein the resource-related operations are performed by drivers that execute in kernel mode.

9. The method of claim 5, wherein checking the resource-related operations further comprise allocating and freeing page table entries.

10. The method of claim 1, wherein the memory corruption occurs in memory reserved for kernel processes.

11. The method of claim 10, wherein the memory corruption occurs by a kernel process writing to a block of memory after the kernel process has freed the block of memory.

12. The method of claim 10, further comprising loading a driver verifier to monitor actions of one or more of the kernel processes.

13. The method of claim 12, wherein the driver verifier provides a memory block to the one or more kernel processes, and wherein the memory block is marked to remain in memory.

14. The method of claim 13, wherein the memory block is aligned with the end of a page of memory having a following page, and wherein the following page is marked as inaccessible, such that an access to the following page results in a access violation.

15. A computing system comprising:
a processor; and
memory storing executable instructions which, when executed by the computing system, implement the method recited in claim 1.

16. A computer implemented method comprising:
storing information associated with the system crash of a particular type, the information including a stop code that identifies the particular type of system crash;
reading the stop code from the information, wherein reading the stop code occurs after an operating system begins executing; and
automatically initiating a diagnostic procedure associated with the stop code, the diagnostic procedure designed to identify an instruction or software component that caused the system crash by collecting data tailored to identifying errors of the particular type that cause the system crash.

17. The method of claim 16, further comprising changing the stop code before initiating the diagnostic procedure to select the diagnostic procedure.

18. A computer implemented method comprising:
performing ordinary error checking until a system crash of a particular type occurs; and
after the system crash, power on self tests, and initiation of booting to an operating system, executing instructions and automatically performing enhanced error checking, the enhanced error checking performed depending on the particular type of system crash and operating to assist in locating instructions or software components that caused the system crash, and wherein the enhanced error checking comprises checking resource-related operations including allocating and freeing memory.

19. The method of claim 18, wherein checking the resource-related operations comprises tracking each allocation and freeing of memory performed by at least one process.

20. A computing system comprising:
a processor; and
memory storing executable instructions which, when executed by the computing system, implement the method recited in claim 1.

21. A computer implemented method comprising:
performing ordinary error checking until a system crash of a particular type occurs; and
after the system crash, power on self tests, and initiation of booting to an operating system, executing instructions and automatically performing enhanced error checking, the enhanced error checking performed depending on the particular type of system crash and operating to assist in locating instructions or software components that caused the system crash, wherein the enhanced error checking comprises checking resource-related operations, and wherein the resource-related operations are performed by drivers that execute in kernel mode.

22. A computing system comprising:
a processor; and
memory storing executable instructions which, when executed by the computing system, implement the method recited in claim 21.

23. A computer implemented method comprising:
performing ordinary error checking until a system crash of a particular type occurs; and
after the system crash, power on self tests, and initiation of booting to an operating system, executing instructions and automatically performing enhanced error checking, the enhanced error checking performed depending on the particular type of system crash and operating to assist in locating instructions or software components that cause the system crash, wherein the enhance error checking comprises checking resource-related operations including allocating and freeing page table entries.

24. A computing system comprising:
a processor; and
memory storing executable instructions which, when executed by the computing system, implement the method recited in claim 23.

* * * * *

UNITED STATES PATENT AND TRADEMARK OFFICE
CERTIFICATE OF CORRECTION

| | | |
|---|---|---|
| PATENT NO. | : 7,398,430 B2 | Page 1 of 1 |
| APPLICATION NO. | : 11/549073 | |
| DATED | : July 8, 2008 | |
| INVENTOR(S) | : Landy Wang et al. | |

It is certified that error appears in the above-identified patent and that said Letters Patent is hereby corrected as shown below:

In column 12, line 35, after "errors" insert -- , --.

In column 15, line 15, in Claim 20, delete "claim 1." and insert -- claim 18 --, therefor.

Signed and Sealed this
Twelfth Day of July, 2011

David J. Kappos
*Director of the United States Patent and Trademark Office*